(12) United States Patent
Box

(10) Patent No.: US 6,370,861 B1
(45) Date of Patent: Apr. 16, 2002

(54) SOLID FUEL AFTERBURNER AND METHOD OF USING THE SAME TO IMPROVE THRUST AND STARTING CAPABILITIES OF A TURBOJET ENGINE

(75) Inventor: John William Box, Coral Gables, FL (US)

(73) Assignee: Locust USA, Inc., Miami, FL (US)

( * ) Notice: Subject to any disclaimer, the term of this patent is extended or adjusted under 35 U.S.C. 154(b) by 0 days.

(21) Appl. No.: 09/612,161

(22) Filed: Jul. 7, 2000

(51) Int. Cl.⁷ .............................. F02C 13/10; F02G 3/00
(52) U.S. Cl. .......................... 60/39.02; 60/253; 60/251
(58) Field of Search .................. 60/39, 47, 462, 60/253, 251, 39.02, 250

(56) References Cited

U.S. PATENT DOCUMENTS

| | | | |
|---|---|---|---|
| 2,457,833 A | 1/1949 | Redding | 60/49 |
| 2,559,006 A | 7/1951 | Clapham | 60/41 |
| 2,620,627 A | 12/1952 | Nardone | 60/39.47 |
| 2,640,315 A | 6/1953 | Secord | 60/35.6 |
| 2,811,829 A | 11/1957 | Topinka | 60/35.6 |
| 2,842,937 A | 7/1958 | Clark | 60/39.14 |
| 2,917,894 A | 12/1959 | Fox | 60/35.6 |
| 2,960,824 A | 11/1960 | Plummer | 60/39.14 |
| 2,984,976 A | 5/1961 | Volk | 60/39.14 |
| 2,985,104 A | 5/1961 | Fox | 102/39 |
| 2,986,879 A | 6/1961 | Volk | 60/39.14 |
| 3,017,748 A | 1/1962 | Burnside | 60/35.6 |
| 3,032,970 A | 5/1962 | Fox | 60/35.3 |
| 3,238,721 A | 3/1966 | Brandes | 60/39.75 |
| 4,131,223 A | 12/1978 | Owen | 60/263 |
| 5,010,728 A | 4/1991 | Joy | 60/39.64 |
| 5,063,735 A | 11/1991 | Colgren | 60/246 |
| H1007 H | 1/1992 | Schadow | 60/210 |
| 5,343,690 A | 9/1994 | Shekleton | 60/39.02 |

Primary Examiner—Charles G. Freay
Assistant Examiner—William Rodriguez
(74) Attorney, Agent, or Firm—David P. Gordon; David S. Jacobson; Thomas A. Gallagher

(57) ABSTRACT

A turbojet engine includes a housing having a forward inlet nozzle, an aft exhaust nozzle, a combustion chamber therebetween, a compressor between the inlet nozzle and the combustion chamber, and a turbine between the combustion chamber and the exhaust nozzle. A liquid fuel injector is provided to inject atomized or vaporized fuel into the chamber for combustion therein. In addition, a solid fuel is provided in the aft exhaust nozzle. The solid fuel may be used to assist the starting of the engine, particularly useful under adverse starting conditions. That is, when the compressor begins to spin up to pump air through the engine, the solid fuel in the exhaust nozzle is ignited by an igniter which begins to combust with the oxygen rich air introduced by the compressor. This combustion increases the temperature in the entire engine, such that when liquid fuel is injected in the combustion chamber, the temperature is sufficiently high to allow the liquid fuel to burn in a self-sustaining manner. Thus, the engine is ignited from the back, and after ignition, the solid fuel continues to burn providing an afterburner effect boosting the thrust until the solid fuel is depleted. Alternatively, the solid fuel can be ignited after the liquid fuel is undergoing a self-sustained burn to provide an afterburner effect.

30 Claims, 2 Drawing Sheets

SOLID FUEL AFTERBURNER AND METHOD OF USING THE SAME TO IMPROVE THRUST AND STARTING CAPABILITIES OF A TURBOJET ENGINE

BACKGROUND OF THE INVENTION

1. Field of the Invention

This invention relates broadly to turbine jet (turbojet) engines. More particularly, this invention relates to afterburners that increase thrust and facilitate the starting of a turbojet engine.

2. State of the Art

Most small disposable missiles in use today are propelled by solid fuel rocket engines as opposed to liquid fuel injected turbojet engines. The selection of an engine powered by solid fuel as a propulsion device for small disposable rockets and missiles has been largely dictated by three factors. First, solid fuel rocket engines are simpler to design and more affordable to construct than liquid fueled turbojet engines. Second, solid fuel propellant is a relatively high density high energy fuel source which burns hotter than liquid fuel. Because of its high density high energy characteristics, a smaller quantity of solid fuel is required to produce an equivalent amount of thrust. Further, solid fuel is easier to install within an engine and remains relatively stable until ignited. Once ignited, solid fuel rocket engines produce an intense blast or "burst" of thrust and continue to produce thrust at a substantially constant rate until all the solid fuel is depleted.

Unfortunately, solid fuel rocket engines have several important disadvantages. First, there is no way to stop the burn once the fuel is ignited. Second, there is little way to control the burn, augment the burn, or correct resulting inefficiencies caused by an uneven burn once the fuel charge is ignited. What small degree of thrust modulation or augmentation capability is available in such systems is typically provided either by introduction of an oxidizer into the combustion environment or an additive into the solid fuel itself. However, these solutions introduce additional complications and disadvantages to the already existing problems of the system.

Turbojet engines offer many advantages over the solid fuel rocket type engines typically used as propulsion systems for short ranges disposable rockets and missiles. Turbojet engines typically use readily available, relatively inexpensive liquid fuel which produces a relatively efficient burn for known temperature and air density parameters. Turbojet engines offer a considerably greater degree of control or modulation of thrust and therefore a greater degree of control of the flight path or trajectory of the missile.

While turbojet engines provide advantages over solid fuel rocket engines, there are several disadvantages. One important disadvantage of current turbojet engines, particularly for use in small disposable rockets and missiles, is that they are complicated and difficult to start. Turbojet engines require a starting sequence involving spooling up or prestarting the compressor to initiate combustion (i.e., to spool up the compressor to provide a sufficient mass flow of air and temperature through the combustion chamber), and using an auxiliary means, such as an explosive starter cartridge system to initiate combustion in the combustion chamber. Achieving a level of combustion necessary to result in a sustained burn is particularly difficult at high altitudes, e.g., over 30,000 feet, due to the relatively low levels of oxygen in the air at those elevations. However, aircraft-launched rockets and missiles may require starting at such altitudes.

Another disadvantage is that a greater quantity of liquid fuel is required to produce the same propulsive thrust as a smaller quantity of the denser solid fuel making the vehicle considerably heavier than it would otherwise be and requiring a greater space within the projectile to house fuel. Turbojet engines can be equipped with afterburners to produce a significant increased thrust component for a short period of time. Afterburners in jet turbines typically operate by injecting raw liquid fuel (i.e., spraying atomized fuel particles) into the stream of hot exhaust gasses venting from the combustion chamber of the engine into the tail pipe or aft nozzle of the engines. The atomized liquid fuel combines with the oxygen naturally present in the superheated exhaust as well as with unburned fuel in the exhaust remaining from combustion to create a "burst" of thrust for short periods of time. The "burst" of thrust simulates for a time the thrust produced by a solid fuel rocket engine. Afterburners use the already heated high velocity exhaust gases to increase the thrust thereby increasing the burn temperature and therefore the efficiency of the burn. Unfortunately, conventional liquid fuel afterburner injection systems are expensive to design and manufacture (particularly for disposable systems), are functionally complex, add considerable weight to an already weight sensitive system by increasing the liquid fuel requirement, are subject to clog or malfunction, require a separate or cooperating fuel supply and distribution system, and consume additional space within the already cramped confines of the vehicle. Further, such systems require use of special high cost materials able to withstand the extremely high temperatures generated in the aft nozzle portion of the engine. More importantly, because of the fuel burn characteristics of liquid fuels, the thrust generated by liquid fueled afterburners is not equivalent to the thrust produced in a solid fuel rocket engine.

For small engines like those used in small, disposable rockets or missiles, any additional weight or space requirement, functional complication, or expense decreases suitability for use. In order to replace solid rockets with turbojet engines as propulsion sources for disposable missiles, it is necessary to reduce the cost and weight, facilitate manufacture, and provide improved systems to start the engine and increase the short-term thrust produced by the engine.

SUMMARY OF THE INVENTION

It is therefore an object of the invention to provide a turbojet engine with an afterburner for use on small disposable rockets and missiles which is simple to design, affordable to construct, does not add substantial weight, is sized to fit within a space allocated for the propulsion system, and is efficient to operate.

It is another object of the invention to provide an improved afterburner for a turbojet engine for use on small disposable rockets and missiles which uses solid fuel to provide a boost of thrust for a period of time.

It is a further object of the invention to provide an afterburner system for a turbojet engine for use on small disposable rockets and missiles which facilitates starting the engine.

It is an additional object of the invention to provide a solid fuel afterburner for a turbojet engine which includes an oxidizer within the fuel to control the rate and temperature of the burn and which prevents the fuel from fully burning until the engine compressor has spooled up sufficiently to provide a required amount of oxygen to the exhaust gases directed to the afterburner.

In accord with these objects, which will be discussed in detail below, a turbojet engine is provided which includes a housing having a forward inlet nozzle, an aft exhaust nozzle, and a combustion chamber therebetween. The aft exhaust nozzle is preferably a variable area nozzle which permits optimization of engine performance. The engine also includes a compressor between the inlet nozzle and the combustion chamber, and a turbine between the combustion chamber and the exhaust nozzle. A shaft couples the compressor and the turbine together such that rotation of the turbine causes rotation of the compressor. A liquid fuel injector and atomizer are provided to inject atomized fuel into the chamber for combustion therein. In addition, a solid fuel element is provided in the aft exhaust nozzle, e.g., lining the inner surface of the exhaust nozzle.

The solid fuel may be used to assist the starting of the engine, particularly useful under adverse starting conditions. That is, when the compressor begins to spin up to pump air through the engine, the solid fuel in the exhaust pipe is ignited by an igniter which begins to combust with the oxygen rich air introduced by the compressor. This combustion increases the temperature in the entire engine, such that when liquid fuel is injected in the combustion chamber, the temperature is sufficiently high to allow the liquid fuel to burn in a self-sustaining manner. Thus, the engine is ignited from the back, and after ignition, the solid fuel continues to burn, providing an afterburner effect boosting the thrust until the solid fuel is depleted.

Alternatively, the solid fuel can be ignited after the liquid fuel is undergoing a self-sustained burn. In this situation, the solid fuel solely functions to provide an afterburner effect.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
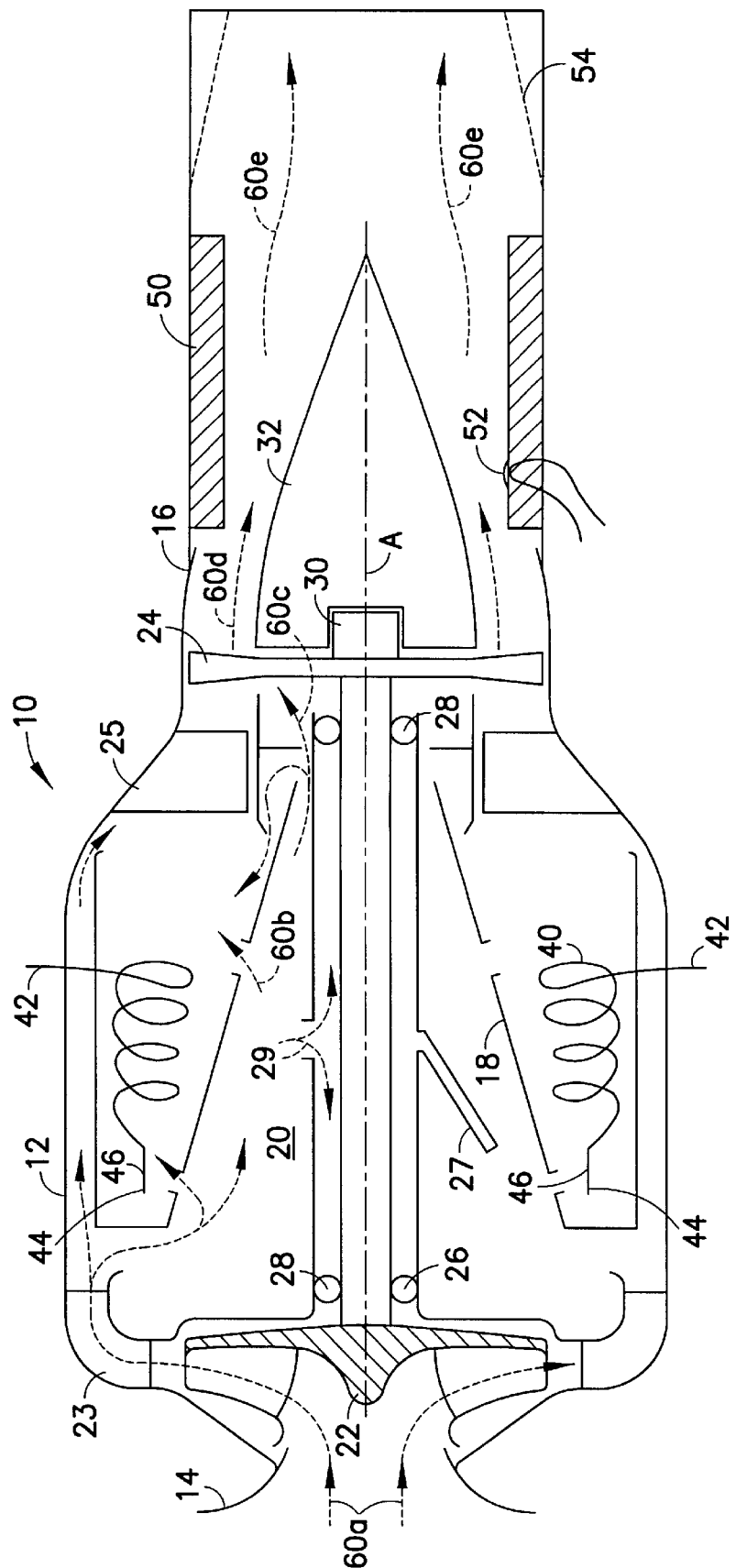
FIG. 1 is a schematic section of a turbine engine according to the invention.

Turning now to FIG. 1, a turbine engine 10 according to the invention is shown. The turbine engine 10 includes a housing 12 defining a longitudinal axis A, a forward inlet nozzle 14, an aft exhaust pipe (nozzle) 16, and a combustion chamber 20 therebetween. The combustion chamber 20 includes a hollow, perforate piece of metal 18 (or can) having an interior surface. In addition, the engine 10 includes a compressor wheel (a compressor) 22 and compressor diffuser 23 provided between the inlet nozzle 14 and the combustion chamber 20, and a turbine diffuser blade 25 and turbine 24 provided between the combustion chamber 20 and the exhaust 16. A shaft 26 rotatably mounted on a ballrace 28 couples the compressor 22 and the turbine 24 together such that rotation of the turbine cause rotation of the compressor. An oil conduit 27 provides a lubricant to the ballrace 28. Additionally, air enters the ballrace 28 through an entry 29. An electric starter 30 is coupled to compressor 22 to spin the compressor on starting the engine. A preferably axially adjustable flow stabilizer 32 is provided within the exhaust pipe 16.

A vaporizer 40, having an inlet 42 and an exit 44 and adapted to vaporize liquid fuel flowing therethrough, is provided within the hollow walls of the can 18.

According to the invention, one or more solid fuel elements 50 are provided in the exhaust pipe 16, preferably about the flow stabilizer 32. Preferred solid fuels include castable and curable urethane rubber-like compounds, although any fuel used in a solid rocket booster may be used. The thickness, length, and surface area of the solid fuel can be varied for the performance required in accord with known parameters in the solid rocket booster field. Optionally, a solid oxidizer and preferably also solid stabilizers (to limit unintended combustion) may be mixed with the solid fuel to facilitate ignition of the solid fuel. Preferably, if a solid oxidizer is added, in order to maximize safety and the energy content of the fuel, the solid fuel/oxidizer mixture is chosen such that the mixture will not burn in a vigorous manner until the extra oxygen provided by the starter spinning the compressor is present. Examples of solid oxidizers include perchlorate and nitrate compounds. Examples of solid stabilizers are finely powdered aluminum, magnesium, and carbon. An igniter 52 is positioned to ignite the solid fuel 50. In addition, a variable area nozzle 54 is preferably provided aft the location of the solid fuel 50 in the exhaust pipe 16.

In operation, the starter 30 is operated to spin the compressor 22 and air 60a enters the inlet nozzle 14 and the combustion chamber 20. The solid fuel 50 is then ignited by the igniter 52 and combusts with the oxygen in the air flowing through the engine. The solid fuel 50 conductively heats the combustion chamber 20 to a temperature sufficient to permit a sustained burn of the liquid fuel. Atomized or vaporized liquid fuel is then injected from the atomizer 40 into the combustion chamber 20 through the turbine 24 and into the exhaust pipe 16, and immediately undergoes a self-sustained burn as the liquid fuel is ignited by the solid fuel 50. As such, the engine is ignited from the back, i.e., backstarted. The burn of the liquid fuel causes the air 60b forced through the combustion chamber to be heated and pressurized. The air 60c is then forced through the turbine 24, which absorbs the necessary energy from the expelled gases to power the compressor 22, while the greater part of the energy is utilized to develop propulsive thrust. The air 60d is then expelled through exhaust pipe 16 at the aft end of the engine 10. As the solid fuel 50 continues to burn, the oxygen and unburned fuel remaining in the exhaust air 60e is burned in an afterburner effect by the burning solid fuel 50. This boosts the thrust of engine until the solid fuel is depleted. The variable area nozzle 54 aids in optimizing engine performance in view of the afterburner effect.

Alternatively, the solid fuel can be ignited after the liquid fuel is undergoing a self-sustained burn after a conventional start. In this situation, the solid fuel solely functions to provide an afterburner effect, and a heating element 46 is used to ignite the liquid fuel.

Figure 2:
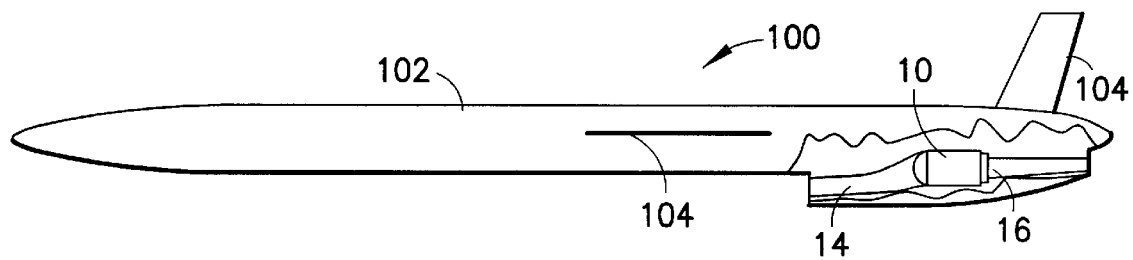
FIG. 2 is a partially broken side elevation of a missile provided with a turbine engine according to the invention.
Figure 3:
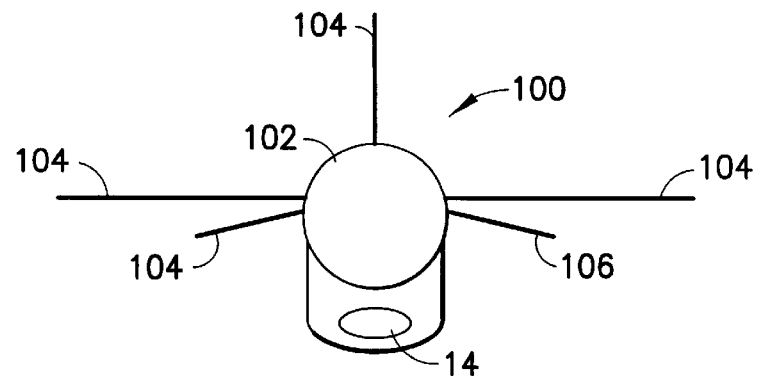
FIG. 3 is a front view of the missile provided with a turbine engine according to the invention.

In each operation, due to the complete consumption of the solid fuel, the engine is particularly suitable for single use turbojet engines, for example, of the type used in missiles. Referring to FIGS. 2 and 3, a missile 100 is shown including a turbojet engine 10 according to the invention. The missile preferably includes a generally cylindrical body 102 and stabilizers (wings) 104. The engine 10 is coupled to, or within, the body 102 of the missile 100. An intake 14 provides air to the engine, and an exhaust pipe 16 at least partially lined or otherwise provided with solid fuel, is adapted to exhaust the compressed air. The backstarting feature assists the engine 10 in starting under adverse conditions, such as high altitude, e.g., when the missile 100 is launched from an airborne vehicle. However, the turbojet engine of the invention may also be used in military and civilian passenger-carrying and payload-carrying aircraft or other reusable applications by arranging the solid fuel as a cartridge system and replacing the cartridge after each flight.

There have been described and illustrated herein an embodiment of a turbine engine, and a method of starting a turbine engine. While particular embodiments of the invention have been described, it is not intended that the invention be limited thereto, as it is intended that the invention be as broad in scope as the art will allow and that the specification be read likewise. Thus, while particular materials for the solid fuel and liquid fuel have been disclosed, it will be appreciated that other solid and liquid fuels may be used as well. In addition, while a vaporizer is disclosed, it will be appreciated that an atomizer can be used as well. Also, while a compressor wheel is preferred, it will be recognized that other axial compressors such as alternating sets of rotating and stationary compressor blades, a turbofan or a turboprop may alternatively be used. It will therefore be appreciated by those skilled in the art that yet other modifications could be made to the provided invention without deviating from its spirit and scope as claimed.

What is claimed is:

1. A turbine engine, comprising:
   a) a housing having a forward end and an aft end, said forward end including an air inlet and said aft end including an exhaust nozzle;
   b) a combustion chamber within said housing;
   c) a compressor between said air inlet and said chamber which compresses air within said combustion chamber;
   d) a turbine between said combustion chamber and said exhaust nozzle and coupled to said compressor, said turbine being rotated by air moving from said combustion chamber to said exhaust nozzle;
   e) a liquid fuel injector which injects liquid fuel into said combustion chamber;
   f) a solid fuel element in said exhaust nozzle; and
   g) a starter which rotates said compressor.

2. A turbine engine according to claim 1, further comprising:
   h) an igniter which ignites said solid fuel.

3. A turbine engine according to claim 1, further comprising wherein:
   h) a hollow perforate metallic element in which said fuel injector and an igniter which ignites said liquid fuel are provided.

4. A turbine engine according to claim 1, wherein:
said fuel injector includes one of a vaporizer which vaporizes said liquid fuel and an atomizer which atomizes said liquid fuel.

5. A turbine engine according to claim 1, wherein:
said solid fuel is a solid rocket fuel.

6. A turbine engine according to claim 1, wherein:
said solid fuel is a urethane compound.

7. A turbine engine according to claim 1, wherein:
said solid fuel is mixed with an oxidizer.

8. A turbine engine according to claim 7, wherein;
said oxidizer is one of a perchlorate and a nitrate.

9. A turbine engine according to claim 7, wherein:
said solid fuel and said oxidizer are mixed with a stabilizer.

10. A turbine engine according to claim 9, wherein:
said stabilizer is at least one of aluminum, magnesium, and carbon.

11. A turbine engine according to claim 7, wherein:
said solid fuel and said oxidizer are provided in a mixture which cannot sustain a vigorous burn unless fed compressed air from said combustion chamber compressed by the rotation of said compressor by said starter.

12. A turbine engine according to claim 1, wherein:
said housing is one of a body of a missile or integral with said body of a missile.

13. A missile, comprising:
a) a missile body; and
b) a turbine engine coupled to or integral with said body, said turbine engine having,
   i) a forward end including an air inlet,
   ii) an aft end including an exhaust nozzle,
   iii) a combustion chamber between said air inlet and said exhaust nozzle,
   iv) a compressor between said air inlet and said combustion chamber which compresses air within said combustion chamber,
   v) a starter which rotates said compressor,
   vi) a turbine between said combustion chamber and said exhaust nozzle and coupled to said compressor, said turbine being rotated by air moving from said combustion chamber to said exhaust nozzle,
   vii) a liquid fuel injector which injects liquid fuel into said combustion chamber, and
   viii) a solid fuel element in said exhaust nozzle.

14. A method of starting a turbine engine, comprising:
a) providing a turbine engine having,
   i) a housing having a forward end and an aft end, said forward end including an air inlet and said aft end including an exhaust nozzle,
   ii) a combustion chamber within said housing,
   iii) a compressor between said air inlet and said chamber which compresses air within said combustion chamber,
   iv) a starter which rotates said compressor,
   v) a turbine between said chamber and said exhaust nozzle,
   vi) a liquid fuel injector which injects liquid fuel into said chamber,
   vii) a solid fuel element in said exhaust nozzle, and
   viii) an igniter which ignites said solid fuel;
b) activating said starter to cause said compressor to compress air within said combustion chamber; and
c) activating said igniter to cause said solid fuel to burn such that compressed air within said combustion chamber is heated to a temperature which causes said liquid fuel to burn in a self-sustained manner.

15. A method according to claim 14, wherein:
said liquid fuel is one of vaporized and atomized prior to burning.

16. A method according to claim 14, wherein:
said solid fuel is a solid rocket fuel.

17. A method according to claim 14, wherein:
said solid fuel is a urethane compound.

18. A method according to claim 14, wherein:
said solid fuel is mixed with an oxidizer.

19. A method according to claim 18, wherein:
said oxidizer is one of a perchlorate and a nitrate.

20. A method according to claim 18, wherein:
said solid fuel and said oxidizer are mixed with a stabilizer.

21. A method according to claim 20, wherein:

said stabilizer is at least one of aluminum, magnesium, and carbon.

22. A method according to claim 18, wherein:

said solid fuel and said oxidizer are provided in a mixture which cannot sustain a vigorous burn until fed compressed air from said combustion chamber which is compressed by said activating said starter.

23. A method of increasing a thrust of a turbine engine, comprising:
   a) providing a turbine engine having,
      i) a housing having a forward end and an aft end, said forward end including an air inlet and said aft end including an exhaust nozzle,
      ii) a combustion chamber within said housing,
      iii) a compressor between said air inlet and said combustion chamber which compresses air within said combustion chamber,
      iv) a starter which rotates said compressor,
      v) a turbine between said chamber and said exhaust nozzle,
      vi) a liquid fuel injector which injects liquid fuel into said chamber, and
      vii) a solid fuel element in said exhaust nozzle;
   b) activating said starter to cause said compressor to compress air within said combustion chamber;
   c) burning the liquid fuel in a self-sustained manner in said combustion chamber such that air within said combustion chamber is expelled into said exhaust nozzle; and
   d) burning said solid fuel and said expelled air.

24. A method according to claim 23, wherein:

said solid fuel is a solid rocket fuel.

25. A method according to claim 23, wherein:

said solid fuel is a urethane compound.

26. A method according to claim 23, wherein:

said solid fuel is mixed with an oxidizer.

27. A method according to claim 26, wherein:

said oxidizer is one of a perchlorate and a nitrate.

28. A method according to claim 26, wherein:

said solid fuel and said oxidizer are mixed with a stabilizer.

29. A method according to claim 28, wherein:

said stabilizer is at least one of aluminum, magnesium, and carbon.

30. A turbine engine, comprising:
   a) a housing having a forward end and an aft end, said forward end including an air inlet and said aft end including an exhaust nozzle;
   b) a combustion chamber within said housing;
   c) a compressor between said air inlet and said chamber which compresses air within said combustion chamber;
   d) a turbine between said combustion chamber and said exhaust nozzle and coupled to said compressor, said turbine being rotated by air moving from said combustion chamber to said exhaust nozzle;
   e) a liquid fuel injector which injects liquid fuel into said combustion chamber; and
   f) a solid fuel element in said exhaust nozzle, said solid fuel element not including an oxidizer.

* * * * *